United States Patent
Herr et al.

(10) Patent No.: US 12,365,021 B2
(45) Date of Patent: Jul. 22, 2025

(54) METHOD FOR CONNECTING TWO COMPONENTS, IN PARTICULAR A MOTOR TO A GEARBOX, AND ASSEMBLY WITH A CONNECTION BETWEEN MOTOR AND GEARBOX

(71) Applicant: Maxon International AG, Sachseln (CH)

(72) Inventors: Patrick Herr, Waldkirch (DE); Marco Schelb, Emmendingen (DE); Simon Kälble, Denzlingen (DE)

(73) Assignee: MAXON INTERNATIONAL AG, Sachseln (CH)

( * ) Notice: Subject to any disclaimer, the term of this patent is extended or adjusted under 35 U.S.C. 154(b) by 335 days.

(21) Appl. No.: 17/842,069

(22) Filed: Jun. 16, 2022

(65) Prior Publication Data

US 2022/0402016 A1    Dec. 22, 2022

(30) Foreign Application Priority Data

Jun. 21, 2021   (EP) ..................... 21180561

(51) Int. Cl.
```
B21D 39/04   (2006.01)
B23P 19/02   (2006.01)
B23P 19/04   (2006.01)
B23P 19/12   (2006.01)
F16H 57/02   (2012.01)
```
(52) U.S. Cl.
CPC ............ *B21D 39/048* (2013.01); *B23P 19/02* (2013.01); *B23P 19/047* (2013.01); *B23P 19/12* (2013.01); *F16H 2057/02034* (2013.01); *Y10T 29/49464* (2015.01); *Y10T 29/49465* (2015.01); *Y10T 29/49922* (2015.01); *Y10T 29/49936* (2015.01)

(58) Field of Classification Search
CPC ...... B21D 39/048; B23P 19/02; B23P 19/047; B23P 19/12; Y10T 29/49936; Y10T 29/49922; Y10T 29/49464; Y10T 29/49465; Y10T 29/477
See application file for complete search history.

(56) References Cited

U.S. PATENT DOCUMENTS

2021/0252973 A1\*  8/2021  Engerman ............ B60K 17/046

FOREIGN PATENT DOCUMENTS

| | | |
|---|---|---|
| DE | 102006037694 A1 | 2/2008 |
| EP | 1184958 A2 | 3/2002 |
| EP | 2134585 A1 | 12/2009 |
| EP | 3832171 A1 | 6/2021 |

\* cited by examiner

*Primary Examiner* — Jermie E Cozart
(74) *Attorney, Agent, or Firm* — Dickinson Wright PLLC

(57) ABSTRACT

A form- and/or force-fit connection between the motor and the gearbox is established by screwing together a motor- or gearbox-side first component and the respective motor- or gearbox-side second component. Alternately, an interference fit can be established between these two components by way of an axial lock that includes a lug, which formed on the first component, that is deformed by a caulking tool into a recess formed on the second component.

15 Claims, 5 Drawing Sheets

METHOD FOR CONNECTING TWO COMPONENTS, IN PARTICULAR A MOTOR TO A GEARBOX, AND ASSEMBLY WITH A CONNECTION BETWEEN MOTOR AND GEARBOX

CROSS-REFERENCE TO RELATED APPLICATION

This application claims priority to and the benefit of European Patent Application No. 21180561.9, filed on Jun. 21, 2021, entitled "METHOD FOR CONNECTING TWO COMPONENTS, IN PARTICULAR A MOTOR TO A GEARBOX, AND ASSEMBLY WITH A CONNECTION BETWEEN MOTOR AND GEARBOX," which is hereby incorporated by reference.

BACKGROUND

The present disclosure relates to a method for connecting a motor to a gearbox and to a method for connecting a first component to a second component.

RELATED ART

The prior art discloses a large number of methods for connecting two components and, in particular, for connecting a motor flange of an electric motor to the ring gear of a gearbox. Up to now, conventional connections between the flange and the ring gear have been realized e.g. by a) pressing and welding on the outer diameter of the ring gear, b) pressing and gluing, c) screwing and welding on the outer diameter of the ring gear, d) screwing and gluing, e) pressing and pinning, or f) screwing and pinning.

If the connection is subject to higher loads, a screwed connection is usually used, which, however, has to be additionally secured against unscrewing. One way of securing the screw connection is the use of an adhesive. However, securing the screw connection by means of gluing is not suitable under certain operating conditions. By way of example, the adhesives used will fail in the case of extreme low- or high-temperature applications. Also in high vacuum, securing by means of an adhesive reaches its limits. Moreover, the handling of the adhesive may be complicated and the adhesive used may possibly be injurious to health both during handling and in subsequent operation. If weldable materials are used, screw locking can be realized by welding, but this may lead to visual defects, such as holes, blowholes and stains.

From EP3527853 A1 it is known that an adapter flange can be fixed to an ring gear by means of caulking, gluing or welding. The method of fastening by means of caulking is not described in detail. From EP 0801456 A2 a method is known in the case of which a motor cover with a flange is connected to a tubular electromotor housing by means of caulking. However, the method requires a very special geometry of the motor cover, which is difficult to produce.

SUMMARY

It is the object of the present disclosure to provide a cost-effective method for connecting two components, in particular for connecting a motor to a gearbox, which is easy to carry out and which avoids the above-mentioned drawbacks.

This object is achieved by the features of the independent claim 1.

Accordingly, a method for connecting a motor to a gearbox is given in cases where, first, a form- and/or force-fit connection between the motor and the gearbox is established by screwing together a motor- or gearbox-side first component and the respective motor- or gearbox-side second component to be connected thereto, or by establishing an interference fit between these two components, and wherein, additionally, an axial lock between the two components is then established by means of caulking, in that a lug formed on the first component is deformed by means of a caulking tool into a recess formed on the second component.

The method according to the present disclosure can be carried out easily, quickly, cleanly and at a reasonable price. The two components to be connected to each other need not be cleaned beforehand, as is required, for example, in the case of gluing. Another advantage is that also non-weldable materials can be used. There is also no need for the use of adhesives.

The object is alternatively achieved by the features of the dependent claim 2. It follows that, in the case of a method for connecting a first component to a second component, with an axial lock between these two components being established by means of caulking, a solution according to the present disclosure is given in cases where the axial lock between the two components is established by deforming, by means of a caulking tool, a lug formed on the first component into a recess formed on the second component, wherein the second component is provided with teeth, and wherein also the caulking tool is provided with teeth interacting with the teeth of the second component in the manner of a linear guide during caulking.

The caulking tool is guided along a geometric axis of the teeth of the second component during caulking. In this way, the method according to the present disclosure can be carried out in a specially simple manner and, in particular, with repeat accuracy and precision. It is particularly suitable for connecting components having external or internal teeth, such as the ring gear of a gearbox.

Advantageous embodiments of the present disclosure are the subject matter of the subclaims.

According to a preferred embodiment of the present disclosure, the caulking tool has a wedge-shaped end portion by means of which the lug of the first component is deformed into the recess of the second component. As a result, when the caulking tool moves axially, the lug will be urged with repeat accuracy and precision either radially outwards or radially inwards into the recess provided for this purpose.

According to a particularly preferred embodiment of the present disclosure, a front portion of the second component located closer to the axial end of the second component, which axial end is provided for establishing a connection to the first component, than the recess of the second component, is provided with a profile at least on an end adjoining the recess, wherein the material of the lug is deformed into the profile during caulking, so that a form fit acting in a circumferential direction and serving as an anti-rotation lock is additionally established between the two components. This embodiment is suitable for securing a screw connection particularly reliably against unscrewing. It is, however, also suitable for use in the event that the two components are joined neither by screwing nor by press-fitting. For example, the two components may only be put together via a clearance fit prior to caulking, so that the caulking of the lug will fulfil the complete securing function, both in the axial direction and in the circumferential direction.

Particularly preferred, the profile of the front portion consists of teeth.

According to a particularly preferred embodiment of the present disclosure, the second component is a ring gear with internal teeth, the teeth of the front portion being a continuation of the internal teeth of the ring gear. It is, however, also imaginable that the second component is provided with external teeth. Preferably, however, the second component is provided with internal teeth.

According to another particularly preferred embodiment of the present disclosure, the teeth of the front portion may be produced together with the internal teeth of the ring gear in that the inner diameter in the area of the front portion is chosen to be smaller than the diameter of the tip circle of the internal teeth of the ring gear. However, the teeth of the front portion may also be produced separately.

According to another particularly preferred embodiment of the present disclosure, the caulking tool has a conical end portion provided with external teeth matching the teeth of the front portion, the caulking tool being axially inserted into the ring gear for the purpose of caulking, and the material of the lug being deformed by the conical end portion radially outwards into the teeth of the front portion during caulking, so that a circumferentially acting form fit is established between the two components. This embodiment is particularly suitable in cases where the ring gear is open towards the other side, so that the caulking tool can easily be inserted into the ring gear. The caulking tool according to this embodiment is easy to manufacture. It may essentially consist of a simple shaft with external teeth which, for better guidance, are formed preferably not only on the conical end portion but also over a longer guide section of the shaft, the guide section adjoining the conical end portion.

According to another preferred embodiment of the present disclosure, the recess of the second component is an undercut. The latter is easy to manufacture and, together with the lug, it provides simple but reliable axial securing.

According to another preferred embodiment of the present disclosure, the lug is a hollow-cylindrical projection of the first component, this hollow-cylindrical projection being deformed preferably over the entire circumference into the recess of the second component during caulking. Also a lug formed by a hollow-cylindrical projection can be manufactured easily and at a reasonable price.

According to another specially preferred embodiment of the present disclosure, the first component is screwed to the second component prior to caulking. In this way, a particularly reliable connection is established between the two components.

In this context it will be particularly advantageous when a thread of the second component, which thread serves the purpose of screw-fastening, is located closer to the axial end of the second component, which axial end is provided for establishing a connection to the first component, than the front portion of the second component, the inner diameter of the thread of the second component being larger than the inner diameter of the front portion. This embodiment contributes to a particularly compact structural design.

According to another specially preferred embodiment of the present disclosure, caulking is executed by means of a force/displacement monitored press. The force progression curve can be used for monitoring the quality and thus the correct execution of the method without any need for additional destructive tests, such as sawing open, forming a microsection, determining the press-out force or the twisting moment.

According to a further particularly preferred embodiment of the present disclosure, the form- and/or force-fit connection and the axial lock are established between a motor flange of the motor and a ring gear of the gearbox, so that the motor flange defines the first component and the ring gear of the gearbox the second component.

The present disclosure additionally provides an assembly comprising a motor and a gearbox connected to the motor, wherein the connection between the motor and the gearbox is established in accordance with a method according to the present disclosure.

BRIEF DESCRIPTION OF THE DRAWINGS

An embodiment of the present disclosure will be explained in more detail hereinafter making reference to drawings, in which.

DETAILED DESCRIPTION

Figure 1:
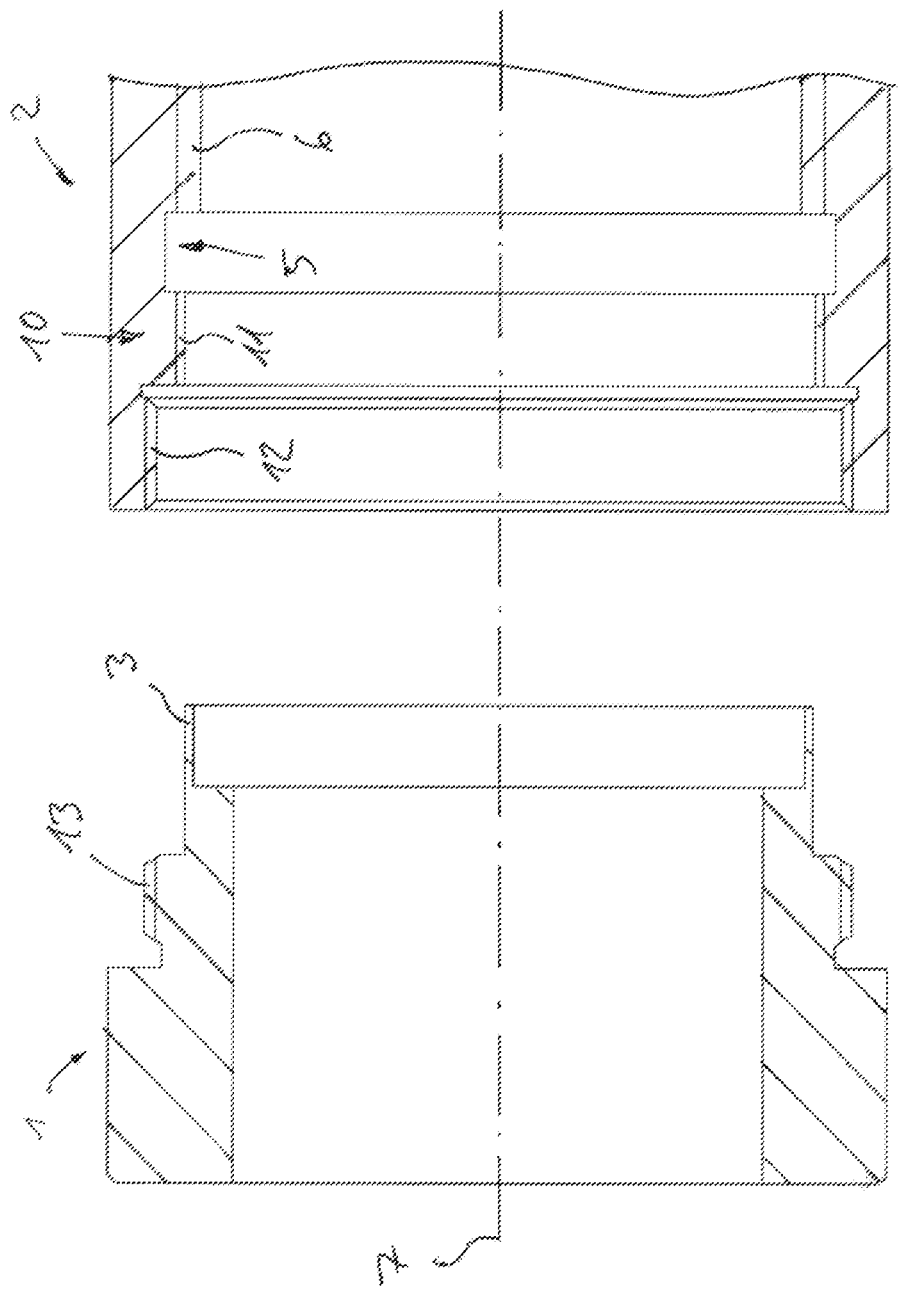
FIG. 1 shows a longitudinal section through a motor flange and a ring gear of a gearbox to be connected thereto, before the two components are joined.

In the statements following hereinbelow, like components are designated by like reference numerals. If a figure contains reference numerals that are not explained in detail in the associated description of the figures, reference is made to preceding or subsequent descriptions of the figures.

FIG. 1 shows a longitudinal section through two components to be connected to each other, viz. a first component 1 and a second component 2. The first component 1 is the motor flange of an electric motor. The second component 2 is the ring gear of a gearbox to be attached thereto. It has internal teeth 6, as is usually the case.

The two components are substantially rotationally symmetrical and have a geometric axis 7 in common. In a first step of the method according to the present disclosure, the two components are screwed together. To this end, the motor flange 1 has an external thread 13, and the ring gear 2 of the gearbox has a complementary internal thread 12 at its left end.

Figure 2:
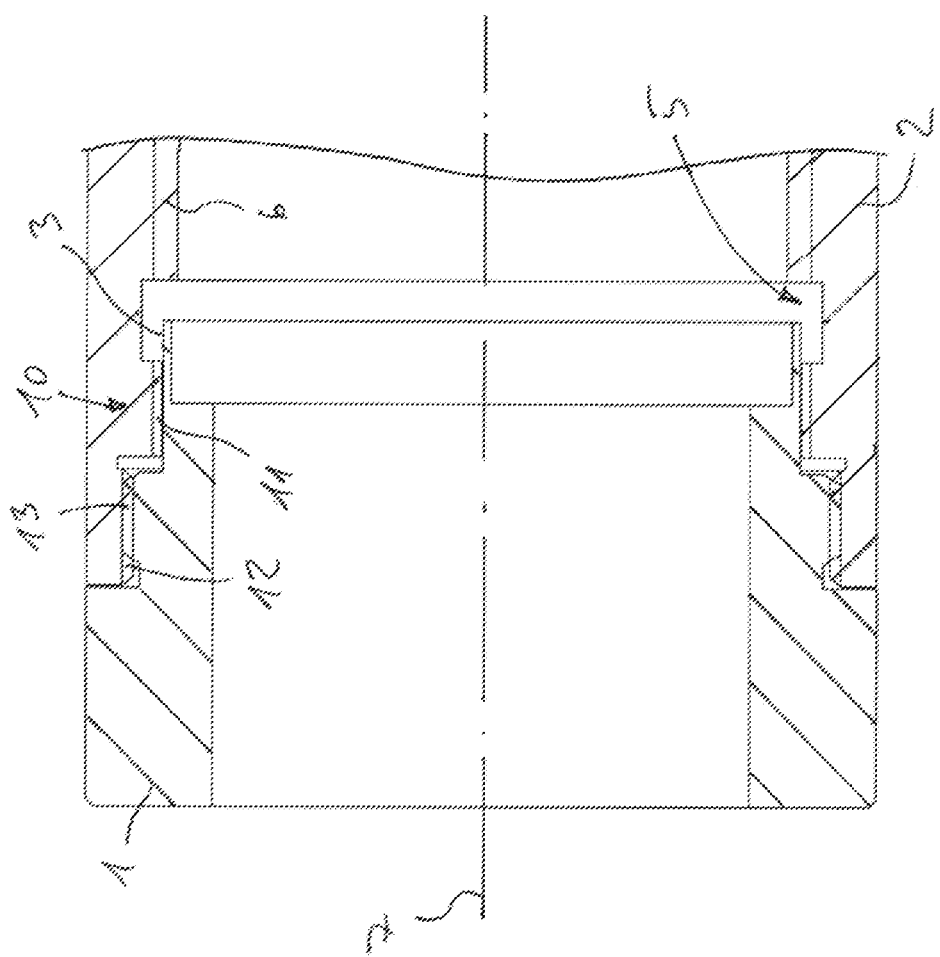
FIG. 2 shows a longitudinal section through the motor flange and the ring gear according to FIG. 1, after the two components have been screwed together.

FIG. 2 shows the assembly after the two components 1 and 2 have been screwed together.

In a second step, the screw connection is secured by means of caulking. For this purpose, the motor flange 1 has a lug in the form of a hollow-cylindrical projection 3, which is deformed into a complementary recess 5 configured in the form of an undercut on the inner circumference of the ring gear 2.

Figure 3:
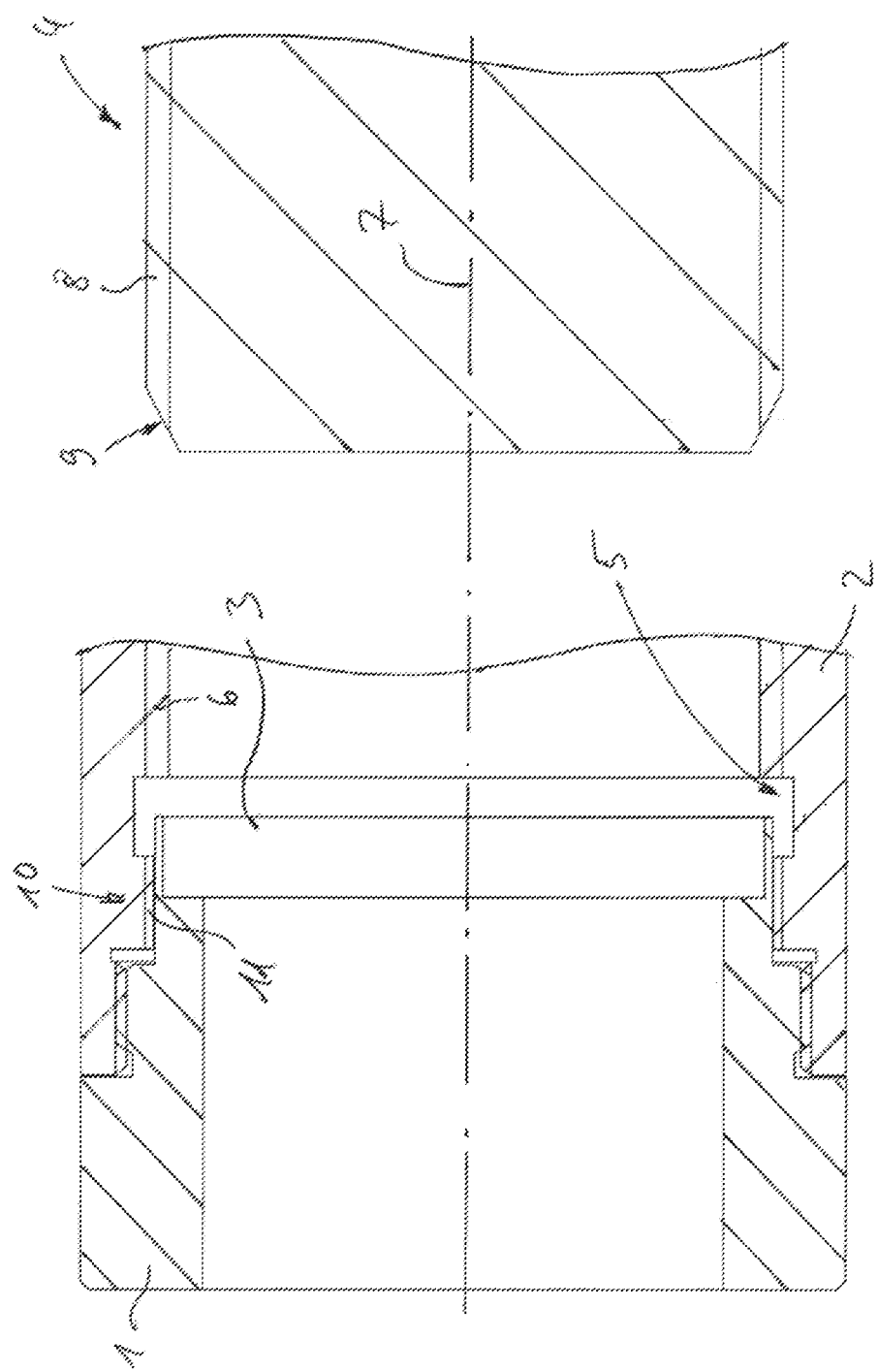
FIG. 3 shows the view according to FIG. 2 with a caulking tool to be inserted through the ring gear.
Figure 4:
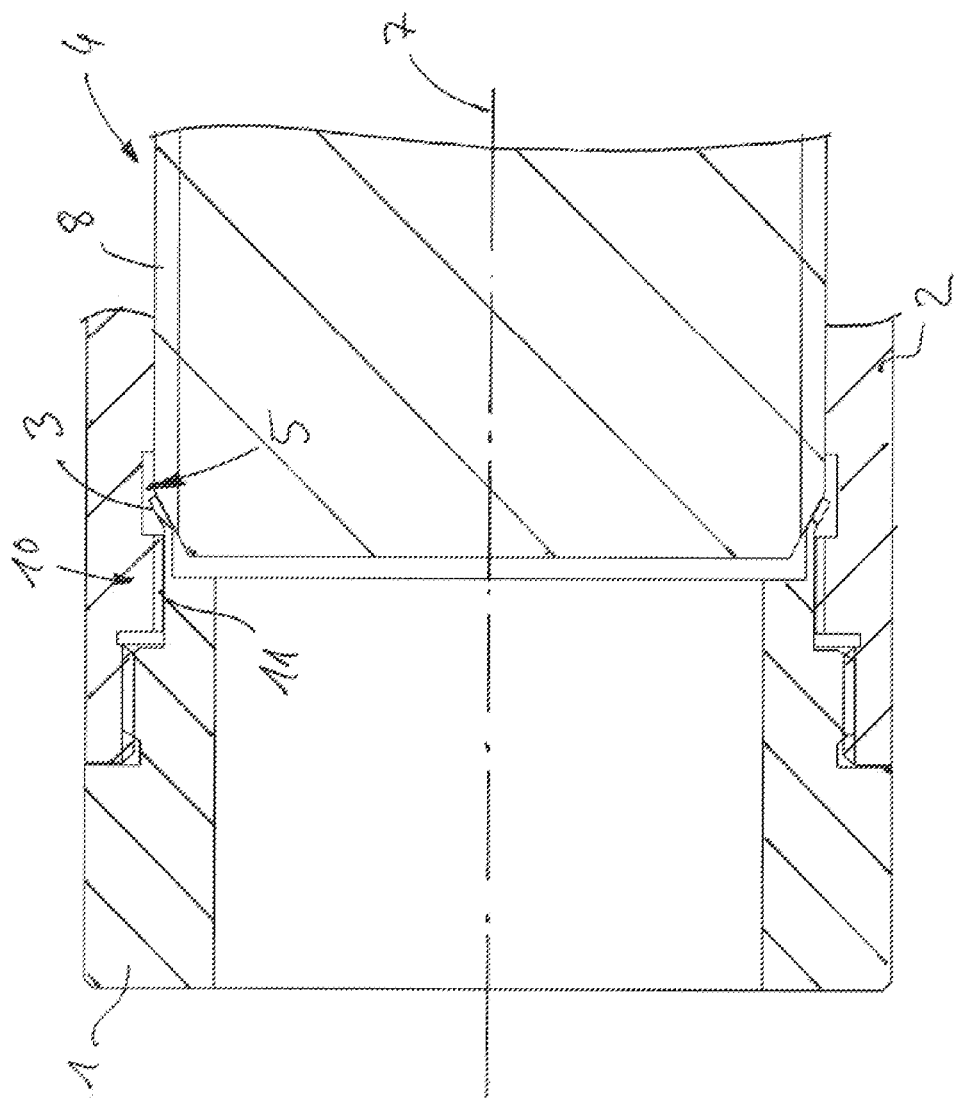
FIG. 4 shows the view according to FIGS. 2 and 3, respectively, with the caulking tool inserted.
Figure 5:
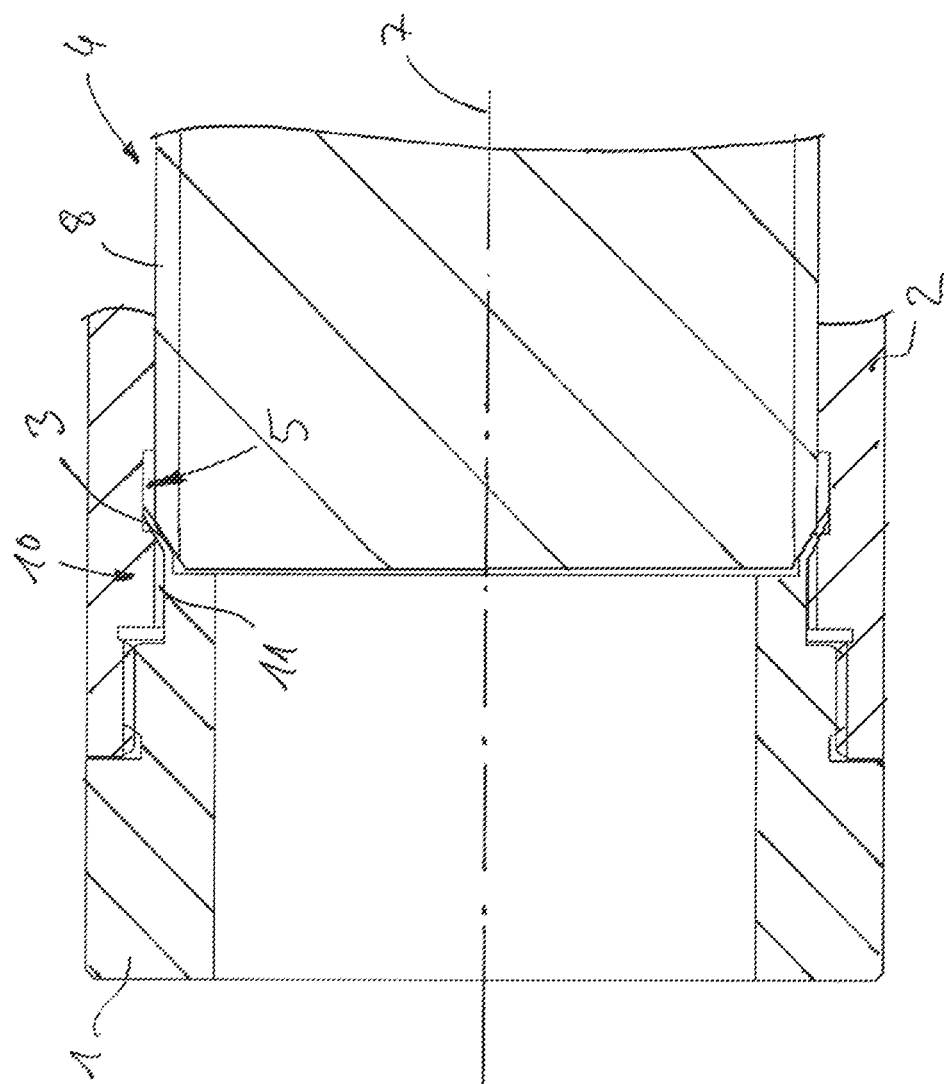
FIG. 5 shows the view according to FIG. 4 with the caulking tool inserted even further.

For the purpose of caulking, the caulking tool 4 shown in FIGS. 3, 4 and 5 is used. The caulking tool 4 essentially consists of a simple shaft having external teeth 8 along its entire length. It can be inserted into the ring gear 2 from the right. In the course of this process, the external teeth 8 of the caulking tool 4 interact with the internal teeth 6 of the ring gear in the manner of a linear guide.

The caulking tool 4 has a conical end portion 9 at its left end. As can be seen in FIG. 4, the material of the lug 3 is deformed radially outwards into the undercut 5 by the conical end portion 9 during caulking, thus establishing an axial lock.

As can especially be seen from FIGS. 1 and 2, a front portion 10 of the ring gear 2, which front portion is arranged directly in front of the undercut 5 and thus closer to the motor flange 1 than the undercut 5, is provided with a profile in the form of internal teeth 11. The internal teeth 11 are preferably produced together with the internal teeth 6 of the ring gear and are thus a continuation of the internal teeth 6. If the caulking tool 4 is inserted even further to the left than shown in FIG. 4, the material of the lug 3 will, as shown in FIG. 5, be deformed by the conical end portion 9 of the caulking tool 4 into the internal teeth 11 of the front portion 10, so that a form fit acting in a circumferential direction will be established between the two components, this form fit serving as an additional anti-rotation lock. In this context, it is particularly advantageous that the external teeth 8 of the caulking tool 4, which match the internal teeth 11 of the front portion 10, also exist on the conical end portion 9.

For carrying out the method precisely and with repeat accuracy, the caulking tool is preferably guided by means of a force/displacement monitored press.

REFERENCE NUMERALS

1 first component/motor flange
2 second component/ring gear
3 lug
4 caulking tool
5 recess/undercut
6 teeth of the second component
7 axis
8 teeth of the caulking tool
9 wedge-shaped/conical end portion
10 front portion
11 teeth of the front portion
12 thread of the second component
13 thread of the first component

What is claimed is:

1. A method for connecting a motor to a gearbox, wherein, first, a form- and/or force-fit connection between the motor and the gearbox is established by screwing together a motor- or gearbox-side first component and the respective motor- or gearbox-side second component to be connected thereto, or by establishing an interference fit between these two components, and wherein, additionally, an axial lock between the two components is then established by caulking, in that a lug formed on the first component is deformed by a caulking tool into a recess formed on the second component.

2. A method for connecting a first component to a second component, with an axial lock between these two components being established by caulking and the method being executed according to claim 1, wherein the axial lock between the two components is established by deforming, by the caulking tool, a lug formed on the first component into the recess formed on the second component, wherein the second component is provided with teeth, and wherein also the caulking tool is provided with teeth interacting with the teeth of the second component in the manner of a linear guide during caulking.

3. The method according to claim 2, wherein the caulking tool has a wedge-shaped end portion by which the lug of the first component is deformed into the recess of the second component.

4. The method according to claim 1, wherein a front portion of the second component located closer to the axial end of the second component, which axial end is provided for establishing a connection to the first component, than the recess of the second component, is provided with a profile at least on an end adjoining the recess, wherein the material of the lug is deformed into the profile during caulking, so that a form fit acting in a circumferential direction and serving as an anti-rotation lock is additionally established between the two components.

5. The method according to claim 4, wherein the profile of the front portion consists of teeth.

6. The method according to claim 5, wherein the second component is a ring gear with internal teeth, the teeth of the front portion being a continuation of the internal teeth of the ring gear.

7. The method according to claim 6, wherein the teeth of the front portion are produced together with the internal teeth of the ring gear in that the inner diameter in the area of the front portion is chosen to be smaller than the diameter of a tip circle of the internal teeth of the ring gear.

8. The method according to claim 6, wherein the caulking tool has a conical end portion provided with external teeth matching the teeth of the front portion, the caulking tool being axially inserted into the ring gear for the purpose of caulking, and the material of the lug being deformed by the conical end portion radially outwards into the teeth of the front portion during caulking, so that a circumferentially acting form fit is established between the two components.

9. The method according to claim 6, wherein prior to caulking, the first component is screwed to the second component, and wherein a thread of the second component, which thread serves the purpose of screw-fastening, is located closer to the axial end of the second component, which axial end is provided for establishing a connection to the first component, than the front portion of the second component, the inner diameter of the thread of the second component being larger than the inner diameter of the front portion.

10. The method according to claim 1, wherein the recess of the second component is an undercut.

11. The method according to claim 1, wherein the lug is a hollow-cylindrical projection of the first component, this hollow-cylindrical projection being deformed preferably over the entire circumference into the recess of the second component during caulking.

12. The method according to claim 1, wherein, prior to caulking, the first component is screwed to the second component.

13. The method according to claim 1, wherein caulking is executed by a force/displacement monitored press.

14. The method according to claim 1, wherein the form- and/or force-fit connection and the axial lock are established between a motor flange of the motor and a ring gear of the gearbox, so that the motor flange defines the first component and the ring gear of the gearbox the second component.

15. An assembly comprising a motor and a gearbox connected to the motor, wherein the connection between the motor and the gearbox is established in accordance with the method set forth in claim 1.

* * * * *